(12) United States Patent
Kondou et al.

(10) Patent No.: US 8,034,642 B2
(45) Date of Patent: Oct. 11, 2011

(54) METHOD FOR PRETREATING ELECTROCHEMICAL CAPACITOR NEGATIVE ELECTRODE, METHOD FOR MANUFACTURING THE ELECTROCHEMICAL CAPACITOR NEGATIVE ELECTRODE, AND METHOD FOR MANUFACTURING ELECTROCHEMICAL CAPACITOR USING THE METHOD FOR MANUFACTURING THE ELECTROCHEMICAL CAPACITOR NEGATIVE ELECTRODE

(75) Inventors: Keiichi Kondou, Hyogo (JP); Susumu Nomoto, Kyoto (JP); Hideki Shimamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 12/302,357

(22) PCT Filed: Jul. 11, 2007

(86) PCT No.: PCT/JP2007/063803
§ 371 (c)(1),
(2), (4) Date: Nov. 25, 2008

(87) PCT Pub. No.: WO2008/007692
PCT Pub. Date: Jan. 17, 2008

(65) Prior Publication Data
US 2009/0271961 A1  Nov. 5, 2009

(30) Foreign Application Priority Data

Jul. 14, 2006  (JP) .................................. 2006-193827

(51) Int. Cl.
*H01L 21/00* (2006.01)
*H01L 21/338* (2006.01)

(52) U.S. Cl. ... 438/19; 438/171; 438/381; 257/E21.008; 29/25.03; 429/126; 429/209

(58) Field of Classification Search .................... 438/19, 438/381, 171, 190; 257/E21.008; 29/25.03, 29/623.4; 429/321, 323, 126, 209
See application file for complete search history.

(56) References Cited

U.S. PATENT DOCUMENTS

| | | | | |
|---|---|---|---|---|
| 5,953,204 | A * | 9/1999 | Suhara et al. ................ | 361/502 |
| 7,713,658 | B2 * | 5/2010 | Mizuta et al. ................ | 429/188 |
| 2002/0034688 | A1 * | 3/2002 | Chu et al. ..................... | 429/232 |
| 2003/0148187 | A1 * | 8/2003 | Yamaguchi et al. .......... | 429/245 |
| 2006/0104009 | A1 | 5/2006 | Kanbara et al. | |
| 2008/0199780 | A1 * | 8/2008 | Hayata et al. ............ | 429/231.95 |
| 2008/0268343 | A1 * | 10/2008 | Sato et al. ................ | 429/231.95 |
| 2008/0286648 | A1 * | 11/2008 | Ihara et al. ..................... | 429/188 |
| 2009/0098459 | A1 * | 4/2009 | Takezawa et al. ............. | 429/209 |

FOREIGN PATENT DOCUMENTS

CN   1776848 A   5/2006

(Continued)

OTHER PUBLICATIONS

International Search Report for PCT/JP2007/063803.
Partial Translation of JP 2006-134785, previously cited on Information Disclosure Statement dated Nov. 25, 2008.

(Continued)

Primary Examiner — Hsien Ming Lee
(74) Attorney, Agent, or Firm — Pearne & Gordon LLP (57) ABSTRACT

A negative electrode of an electrochemical capacitor includes an electrode layer using a material capable of reversibly absorbing and releasing a lithium ion. A method for pretreating the negative electrode includes forming a lithium layer on a substrate by a gas phase method or a liquid phase method, and transferring the lithium layer onto a surface of the electrode layer of the negative electrode.

14 Claims, 4 Drawing Sheets

FOREIGN PATENT DOCUMENTS

| | | |
|---|---|---|
| JP | 64-014882 A | 1/1989 |
| JP | 08-107048 A | 4/1996 |
| JP | 09-019984 A | 1/1997 |
| JP | 09-055342 A | 2/1997 |
| JP | 2005-038720 A | 2/2005 |
| JP | 2006-134785 A | 5/2006 |
| JP | 2007-128658 A | 5/2007 |
| WO | 2007/072713 A1 | 6/2007 |

OTHER PUBLICATIONS

Partial Translation of JP 2005-38720, previously cited on Information Disclosure Statement dated Nov. 25, 2008.

Chinese Office Action dated Dec. 17, 2010.

European Search Report No. 07790607.1 for PCT/JP2007/063803 dated May 27, 2011.

* cited by examiner

METHOD FOR PRETREATING ELECTROCHEMICAL CAPACITOR NEGATIVE ELECTRODE, METHOD FOR MANUFACTURING THE ELECTROCHEMICAL CAPACITOR NEGATIVE ELECTRODE, AND METHOD FOR MANUFACTURING ELECTROCHEMICAL CAPACITOR USING THE METHOD FOR MANUFACTURING THE ELECTROCHEMICAL CAPACITOR NEGATIVE ELECTRODE

This application is a U.S. national phase application of PCT international application PCT/JP2007/063803.

TECHNICAL FIELD

The present invention relates to a method for manufacturing an electrochemical capacitor used for various electronic equipment, a backup power source, regeneration of hybrid cars, fuel cell cars, electric power storage, or the like. More particularly, it relates to a method for pretreating such a negative electrode of an electrochemical capacitor and a method for manufacturing such a negative electrode.

BACKGROUND ART

An electric double layer capacitor has a high withstand voltage, a large capacitance, and a high reliability with respect to rapid charge and discharge. Therefore, it is used in many fields. For positive and negative electrodes of a general electric double layer capacitor, a polarizable electrode mainly including activated carbon is used. Furthermore, the withstand voltage of an electric double layer capacitor is 1.2 V when an aqueous electrolyte solution is used and 2.5-3.3 V when an organic electrolyte solution is used. Since the energy of an electric double layer capacitor is in proportion to the square of the withstand voltage, energy is higher when an organic electrolyte solution having a high withstand voltage is used than when an aqueous electrolyte solution is used. However, the energy density of an electric double layer capacitor using an organic electrolyte solution is 1/10 or less of that of a secondary battery such as a lead storage battery. Therefore, further improvement of the energy density is necessary.

In such circumstances, an electric double layer capacitor has been proposed, in which an electrode using a carbon material capable of absorbing and releasing lithium ions is used as a negative electrode and this carbon material is allowed to absorb a lithium ion in advance. Such an electric double layer capacitor is disclosed in, for example, Patent Document 1. Note here that this capacitor uses a polarizable electrode as a positive electrode, and the polarizable electrode mainly includes activated carbon. As a method for allowing a negative electrode to absorb a lithium ion, the following three methods are disclosed.

1) A carbon material and lithium powder are mixed with each other to produce a negative electrode. This negative electrode is immersed in an electrolyte solution, so that lithium is ionized and lithium ions are chemically absorbed by the carbon material.

2) A negative electrode produced by using a carbon material is immersed in an electrolyte solution in a state in which the negative electrode is brought into contact with a lithium foil, so that the lithium foil is ionized and lithium ions are chemically absorbed by the carbon material.

3) A negative electrode produced by using a carbon material and an electrode including lithium are immersed in an electrolyte solution, and an electric current is allowed to flow between the negative electrode and the electrode, so that a lithium ion is electrochemically absorbed by the carbon material.

The above-mentioned electric double layer capacitor has an advantage of having a high withstand voltage and a large capacitance, and is capable of carrying out rapid charge and discharge. However, an operation for allowing a carbon material to absorb lithium ions by a chemical or electrochemical method in advance is complicated, and much man-hour or cost is required. The carbon material is capable of absorbing and releasing lithium ions. Furthermore, it is difficult to obtain an excellent performance stably.

On the other hand, other than an electric double layer capacitor, a lithium ion secondary battery has been developed as a power source capable of charging and discharging a large electric current. A lithium ion battery has a higher voltage and higher capacity as compared with an electric double layer capacitor. However, a lithium ion battery has a higher resistance and remarkably short lifetime by a charge and discharge cycle in a large current as compared with an electric double layer capacitor.

Patent Document 1: Japanese Patent Unexamined Publication No. H9-55342

SUMMARY OF THE INVENTION

The present invention provides a pretreating method for allowing a negative electrode of an electrochemical capacitor to absorb a lithium ion, the negative electrode using a material capable of reversibly absorbing and releasing lithium ions; a method for manufacturing a negative electrode of an electrochemical capacitor by using the pretreating method; and a method for manufacturing an electrochemical capacitor.

The method for pretreating an electrochemical capacitor negative electrode in accordance with the present invention includes the following two steps:

(A) forming a lithium layer on a substrate by a gas phase method or a liquid phase method; and (B) transferring the lithium layer to a surface of an electrode layer of the negative electrode.

Furthermore, in the method for manufacturing a negative electrode of an electrochemical capacitor, the following step (C) is carried out prior to the above-mentioned steps (A) and (B):

(C) forming an electrode layer by using a material capable of reversibly absorbing and releasing lithium ions on a current collector.

Furthermore, in the method for manufacturing an electrochemical capacitor, the following step (D) is carried out in addition to the above-mentioned steps (A) to (C).

(D) forming a polarizable electrode layer mainly including activated carbon on a current collector so as to produce a positive electrode.

Then, the following steps (E) to (G) are further carried out.

(E) producing an element by allowing the electrode layers of the negative and positive electrodes to face each other with a separator interposed between the positive electrode and the negative electrode;

(F) accommodating the element and an organic electrolyte solution including lithium ions in a case; and (G) sealing an opening of the case.

As mentioned above, in the method for pretreating the negative electrode of the electrochemical capacitor in accordance with the present invention, a lithium layer is formed on the surface of the electrode layer of the negative electrode by decal transferring. With this method, the electrode layer including the carbon material is in a state in which it immediately absorbs lithium ions before the negative electrode is combined with a positive electrode. Therefore, it is not necessary to provide a post-process for allowing the negative electrode to absorb lithium ions, thus improving productivity. Furthermore, a state in which lithium ions are absorbed by the electrode layer of the negative electrode is stabilized. Thus, an electrochemical capacitor having an excellent performance can be produced stably.

DETAILED DESCRIPTION OF THE PREFERRED EMBODIMENT

Figure 1:
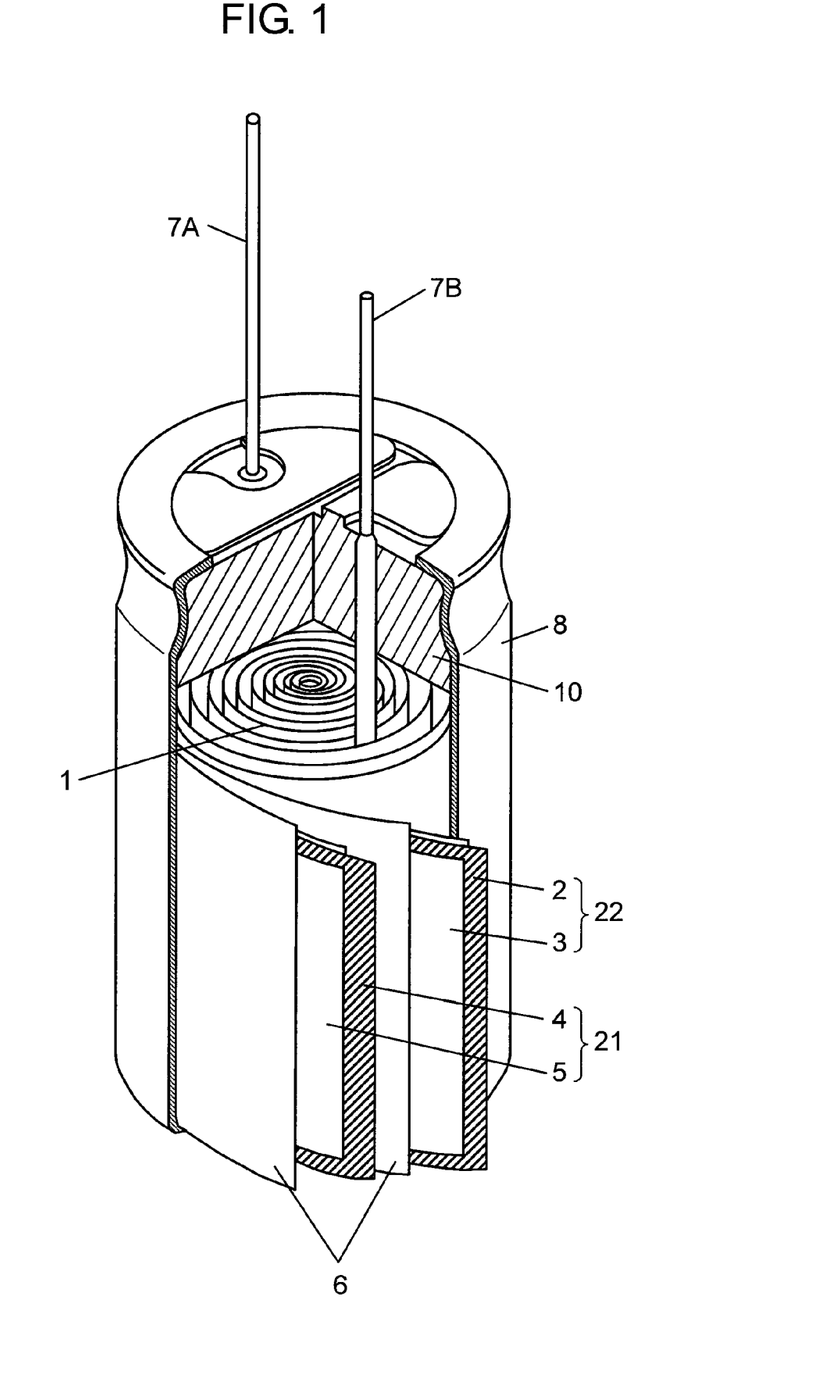
FIG. 1 is a partially cut-away perspective view showing a configuration of an electrochemical capacitor in accordance with an exemplary embodiment of the present invention.
Figure 2A:
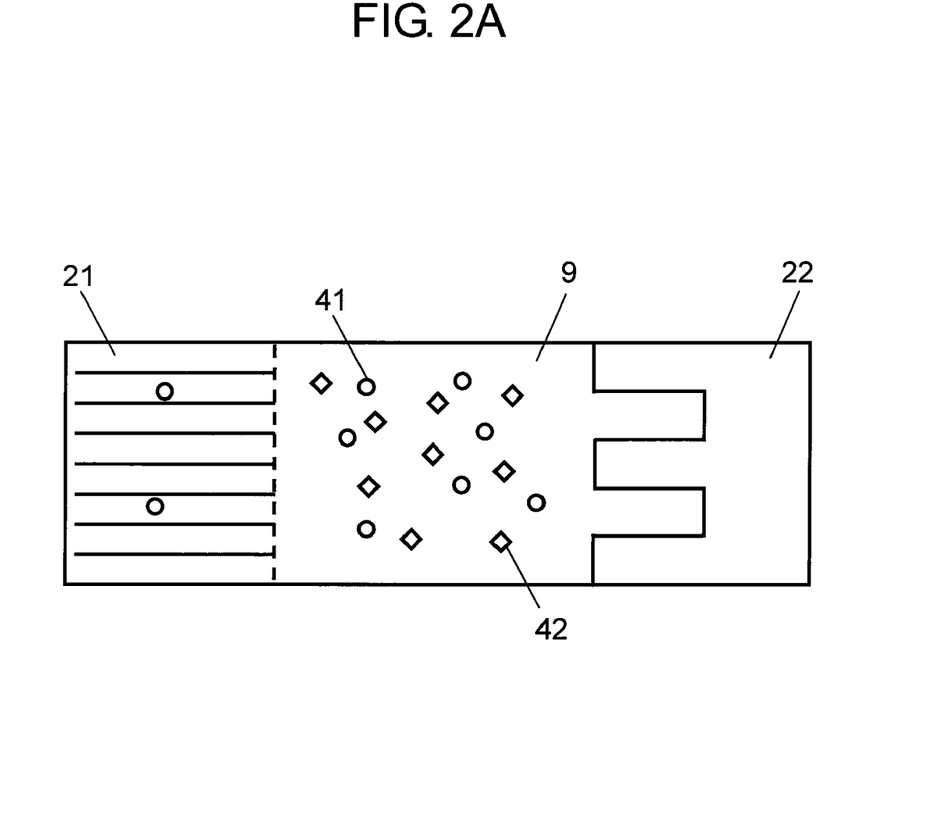
FIG. 2A is a conceptual diagram showing a discharged state of the electrochemical capacitor shown in FIG. 1.
Figure 2B:
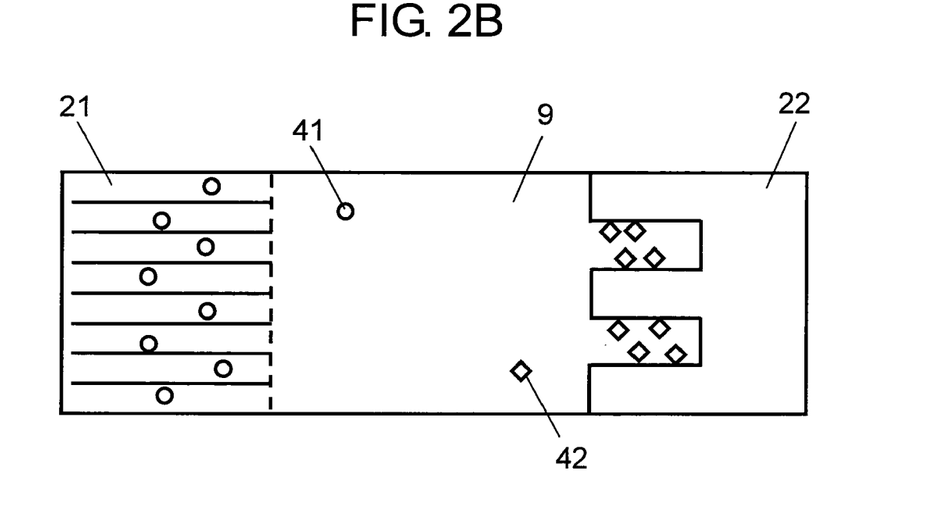
FIG. 2B is a conceptual diagram showing a charged state of the electrochemical capacitor shown in FIG. 1.

FIG. 1 is a partially cut-away perspective view showing a configuration of an electrochemical capacitor in accordance with an exemplary embodiment of the present invention. FIGS. 2A and 2B are conceptual diagrams showing a state in which the electrochemical capacitor is discharged and charged, respectively. This electrochemical capacitor includes element 1, case 8, sealing rubber 10 and electrolyte solution 9.

Element 1 includes negative electrode 21, positive electrode 22 and separator 6. Separator 6 is disposed between negative electrode 21 and positive electrode 22 and prevents negative electrode 21 and positive electrode 22 from being brought into contact with each other.

Negative electrode 21 includes current collector 4 as a first current collector that does not react with lithium, and electrode layers 5 formed on both surfaces of current collector 4. Current collector 4 is, for example, a copper foil. Electrode layer 5 includes a carbon material capable of reversibly absorbing and releasing lithium ions. As such a carbon material, for example, a well-known material such as graphite can be used.

Positive electrode 22 includes current collector 2 as a second current collector that does not react with lithium, and polarizable electrode layers 3 formed on both surfaces of current collector 2. Current collector 2 is, for example, an aluminum foil. Electrode layer 3 mainly includes activated carbon. Lead wires 7A and 7B are coupled to negative electrode 21 and positive electrode 22, respectively. Lead wire 7A is formed of nickel or copper, and lead wire 7B is formed of aluminum.

Element 1 is contained in case 8 together with electrolyte solution 9. An opening of case 8 is processed after sealing rubber 10 is inserted. Thus, case 8 is sealed. Lead wires 7A and 7B are drawn out from through holes provided in sealing rubber 10 toward the outside of case 8. Case 8 is made of, for example, aluminum. Sealing rubber 10 is made of, for example, fluororubber.

Next, an operation principle of this electrochemical capacitor is briefly described with reference to FIGS. 2A and 2B. Electrolyte solution 9 includes lithium ions 41 and anions 42 such as $BF_4^-$. In a discharged state, lithium ions 41 are released from a carbon material included in negative electrode 21, and anions 42 are released from activated carbon included in positive electrode 22. On the other hand, in a charged state, lithium ions 41 are absorbed between layers of the carbon material included in negative electrode 21, and anions 42 are adsorbed to the activated carbon included in positive electrode 22. Due to the movement of charges according to such a movement of the ions, an electrochemical capacitor is charged and discharged. In such a system, negative electrode 21 absorbs lithium ions 41 and thus the electric potential is reduced, so that the voltage of the capacitor is increased. Thus, an energy density is improved.

Next, a method for manufacturing the above-mentioned electrochemical capacitor is described with reference to specific examples. Note here that the present invention is not necessarily limited to this.

Firstly, a procedure for producing positive electrode 22 is described. A 30 μm-thick aluminum foil with high purity (Al: 99.99% or more) is used as current collector 2. This Al foil is etched in a hydrochloric acid-based etching solution so that the surface is roughened.

Subsequently, in order to form electrode layer 3, a paste is prepared. As an activated carbon powder, for example, phenolic resin-based activated carbon powder having an average particle diameter of 5 μm is used. As a conductive agent, for example, carbon black having an average particle diameter of 0.05 μm is used. As an aqueous binder solution, for example, an aqueous solution of carboxymethylcellulose (hereinafter, referred to as "CMC") is used. When the above-mentioned materials are used, the activated carbon powder, conductivity imparting agent, and aqueous binder solution are mixed in a weight ratio of 10:2:1. This mixture is sufficiently kneaded in a kneader, then methanol and water as dispersion media are added thereto little by little, and further kneaded so as to be adjusted to a predetermined viscosity.

This paste is coated on both surfaces of current collector 2 and dried in the air at 100° C. for one hour. Thus, electrode layers 3 are formed. Thereafter, this positive electrode precursor is cut into a predetermined size and lead wire 7B is coupled to current collector 2. Thus, positive electrode 22 is completed.

Next, a procedure for producing negative electrode 21 is described. A 15 μm-thick copper foil is used as current collector 4. Then, a paste is prepared for forming electrode layer 3. As the carbon material capable of reversibly absorbing and releasing lithium ions, for example, graphite is used. As the conductive agent, for example, acetylene black is used. As the binder, for example, polytetrafluoroethylene (hereinafter, referred to as "PTFE") and CMC are used in a weight ratio of 8:2. When the above-mentioned materials are used, graphite, conductive agent and binder are used in a weight ratio of 80:10:10.

When a paste is prepared, CMC, acetylene black, graphite and PTFE are placed into water in this order and stirred and kneaded. The thus prepared paste is coated on both surfaces of current collector 4 by using a comma coater, a die coater, and the like, so that the thickness of the one surface becomes 50 μm, and dried in the air at 80° C. The dried negative electrode precursor is subjected to press processing with linear pressure of 75-100 kgf/cm, so that the thickness of one surface of electrode layer 5 is adjusted to 30 μm and the density to 1.2-1.5 g/cm³. The pressed negative electrode precursor is cut into a predetermined size. Then, lead wire 7A is coupled to current collector 4. Thus, negative electrode 21 before pretreating is completed.

Figure 3:
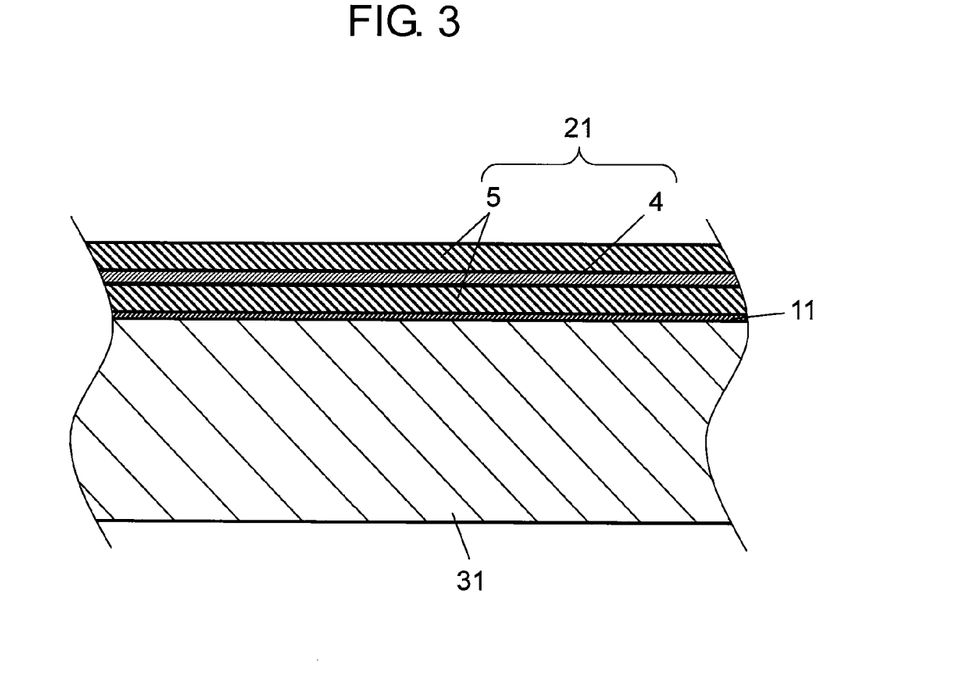
FIG. 3 is an enlarged sectional view showing a state in which a lithium layer is transferred to a negative electrode of the electrochemical capacitor shown in FIG. 1.
Figure 4:
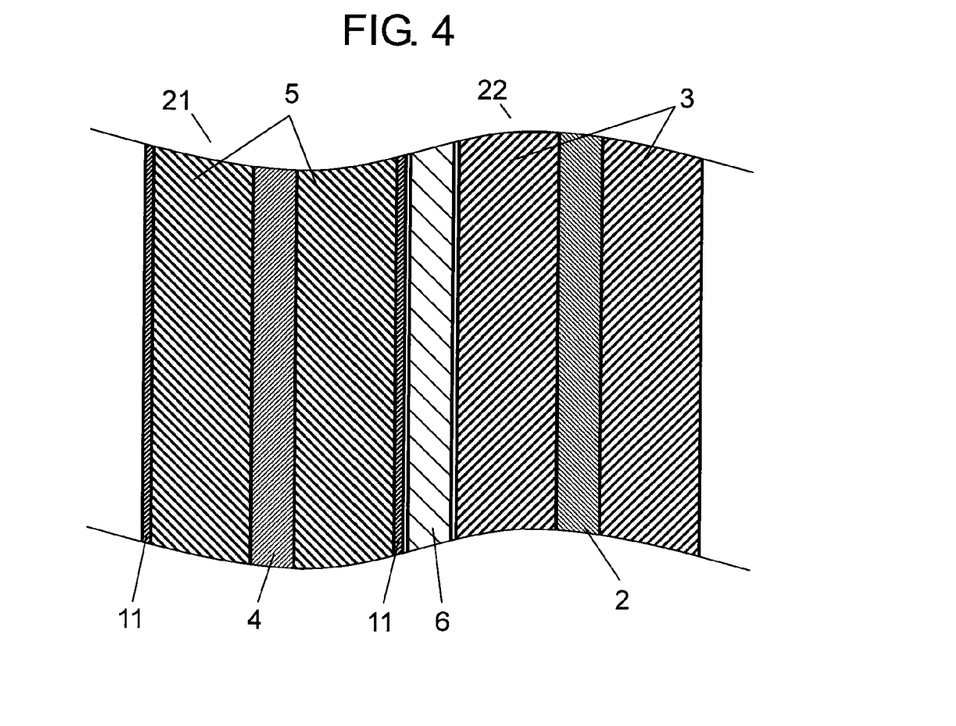
FIG. 4 is an enlarged sectional view showing an element of the electrochemical capacitor shown in FIG. 1 in a state before an electrolyte solution is filled.

Next, a procedure for transferring lithium layer 11 to negative electrode 21 is described with reference to FIGS. 3 and 4. FIG. 3 is an enlarged sectional view showing a state in which lithium layer 11 is transferred to negative electrode 21. FIG. 4 is an enlarged sectional view showing element 1 in a state before electrolyte solution 9 is filled.

Lithium layer 11 having a thickness of 3 μm is formed on substrate 31 made of polypropylene (hereinafter, referred to as "PP") having a thickness of 0.1 mm by using a vapor deposition device. Next, as shown in FIG. 3, lithium layer 11 formed on substrate 31 is transferred to electrode layer 5 formed on negative electrode 21. Thus, 3 μm-thick lithium layer 11 is formed on electrode layer 5. By carrying out the same operation, lithium layer 11 is formed on another of electrode layers 5. The above-mentioned operation is carried out under a dry atmosphere so that lithium layer 11 is not deformed.

Herein, the effect obtained by forming lithium layer 11 and allowing negative electrode 21 to absorb a lithium ion (providing negative electrode 21 with lithium) in advance is utterly different between in a lithium ion secondary battery and in a capacitor, which is described.

An object of providing a negative electrode with lithium in a lithium ion secondary battery is to improve charging and discharging capacity by reducing an irreversible capacity of the negative electrode. In a general negative electrode using a graphite-based material as an active material, the ratio of the irreversible capacity with respect to the negative electrode capacity is about 0% to 20%. Therefore, lithium in an amount corresponding to at most about 20% of the negative electrode capacity may be provided to the negative electrode.

On the other hand, in an electrochemical capacitor using lithium ions, an object of allowing negative electrode 21 to absorb lithium ions in advance is to increase the voltage of the capacitor by reducing an electric potential of negative electrode 21. When the electric potential of positive electrode 22 is reduced as much as possible, the reaction of positive electrode 22 with respect to electrolyte solution 9 can be suppressed, thus enabling the lifetime of the capacitor to be improved. Therefore, when activated carbon is used for positive electrode 22, the electric potential of positive electrode 22 is set to, for example, 4.0 V, on the basis of the oxidation-reduction potential of lithium. In order to set the voltage of the capacitor to be at least 3.8 V or more by using such positive electrode 22, it is necessary to set the electric potential of negative electrode 21 to 0.2 V or less, on the basis of the oxidation-reduction potential of lithium.

In order to reduce the electric potential of negative electrode 21, it is necessary to allow negative electrode 22 to absorb lithium ions as many as possible. That is to say, it is necessary to allow negative electrode 21 to absorb lithium ions in an amount corresponding to at least 50% or more and preferably 70% or more of the capacity of negative electrode 21 in advance.

In this way, an electrochemical capacitor has a peculiar problem that a pre-dope amount of lithium needs to be significantly increased as compared with a lithium ion secondary battery.

In order to solve this problem, Japanese Patent Unexamined Publication No. 2007-128658 discloses a method for forming lithium layer 11 by directly vapor-depositing lithium on the surface of negative electrode 21. However, when lithium in an amount necessary for an electrochemical capacitor is provided by this method, radiant heat from a vapor deposition source, heat of solidification on negative electrode 21 of a vapor deposition atom, and heat by kinetic energy of a vapor deposition atom on negative electrode 21 affect negative electrode 21. When a low heat-resistant binder component contained in electrode layer 5 is dissolved or degraded with such heat, electrode layer 5 is peeled off or the strength is reduced. This influence is particularly remarkable in the vicinity of the surface of negative electrode 21.

Furthermore, since this heat is not easily conducted through a long-length negative electrode 21 uniformly, negative electrode 21 expands or contracts locally. The precursor before negative electrode 21 is cut into a predetermined size has a large width of, for example, 500 mm or more, and about 1000 mm. When expansion or contraction occurs locally, the precursor of negative electrode 21 does not tend to be brought into close contact with a cooling can in a vapor deposition chamber. Therefore, the temperature of the precursor of negative electrode 21 is further increased, finally hindering the feeding or the winding up of the precursor of negative electrode 21 during vapor deposition. As a result, negative electrode 21 cannot be produced.

In this exemplary embodiment, after lithium layer 11 is once formed on substrate 31, it is transferred to the surface of negative electrode 21. By applying this method, lithium in an amount necessary for electrode layer 5 can be provided while a problem of heat in the method of directly vapor depositing lithium on negative electrode 21 is solved.

Negative electrode 21 pretreated as mentioned above and the above-mentioned positive electrode 22 are wound with separator 6 interposed therebetween. Thus, element 1 shown in FIG. 4 is produced.

Next, element 1 is inserted into case 8 together with electrolyte solution 9, and element 1 is impregnated with electrolyte solution 9. Note here that electrolyte solution 9 is prepared by dissolving 1 mol/L of $LiBF_4$ into a mixture solvent obtained by mixing high-dielectric ethylene carbonate and low-viscous diethyl carbonate in a weight ratio of 1:1.

Next, lead wires 7A and 7B drawn out from element 1 are allowed to pass through the through holes provided in sealing rubber 10. Then, sealing rubber 10 is fitted into the opening of case 8. Thereafter, the vicinity of the opening edge of case 8 is subjected to drawing processing and curling processing, thereby sealing case 8. Thus, an electrochemical capacitor is completed.

When element 1 is impregnated with electrolyte solution 9 as mentioned above, lithium of lithium layer 11 and graphite in electrode layer 5 are made to be conductive (short-circuited). Then, due to the difference between electric potentials of both, lithium is ionized and lithium ions start to be absorbed between the layers in the graphite. Furthermore, after the electrochemical capacitor is completed, lithium ions are absorbed in graphite of negative electrode 21 at the time of first charging.

The measurement results of capacitance and resistance of the thus configured electrochemical capacitor in Example 1 of this exemplary embodiment are shown in Table 1. The measurement results of Comparative Example using a conventional method are also shown in Table 1. In the conventional method, a negative electrode with which a lithium foil is brought into contact is immersed in an electrolyte solution, so that the lithium foil is ionized and lithium ions are chemically absorbed.

TABLE 1

|  | Capacitance (F) | Resistance (mΩ) |
|---|---|---|
| Example 1 | 132 | 46 |
| Comparative Example | 130 | 48 |

In an electrochemical capacitor in accordance with this exemplary embodiment, lithium layer 11 is transferred to be formed on electrode layer 5 constituting negative electrode 21. Therefore, at the time when negative electrode 21 is produced, electrode layer 5 is in a state in which it tends to absorb a lithium ion. As a result, Example 1 exhibits the similar performance to Comparative Example as shown in Table 1, and can remarkably simplify or omit a post-process for absorbing a lithium ion. Furthermore, although actual data are not shown, a state in which lithium ions are absorbed by electrode layer 5 becomes stable. Thus, it is possible to produce an electrochemical capacitor having an excellent performance.

Next, results of examination as to materials of substrate 31 and conditions for forming lithium layer 11 are described. Lithium layer 11 is formed by vapor deposition by using various materials for substrate 31 and the peel strength of lithium layer 11 with respect to substrate 31 is measured. The measurement results are shown in Table 2. Results whether or not lithium layer 11 can be transferred to electrode layer 5 are also shown. Note here that the peel strength is measured by "Adhesive/Peel Adhesive Strength Test Method I: 90-degree peel test" conforming to JIS-K6854-1.

TABLE 2

| No. | Substrate material | Substrate temperature at the time of vapor deposition (° C.) | Vapor deposition film thickness (μm) | Peel strength (N/m) | Transfer state |
|---|---|---|---|---|---|
| 1 | PET | 120 | 3.1 | 298 | NG |
| 2 | Glass | 120 | 3.0 | 520 | NG |
| 3 | SUS304 | 120 | 3.1 | 264 | NG |
| 4 | natural rubber | 120 | 3.1 | 388 | NG |
| 5 | Ni | 120 | 3.0 | 463 | NG |
| 6 | Cu | 120 | 3.0 | 443 | NG |
| 7 | PP | 120 | 2.9 | 235 | NG |
| 8 | Cu | 55 | 2.0 | 365 | NG |
| 9 | PP | 55 | 10.1 | 34 | GOOD |
| 10 | PP | 55 | 2.0 | 31 | GOOD |
|  | current collector-electrode layer |  |  | 149 | — |

In Table 2, the transfer state of lithium layer 11 is evaluated as follows: a case in which lithium layer 11 can be transferred to substrate 31 without remaining is denoted by GOOD and a case in which a part, even a little, of lithium layer 11 remains is denoted by NG. As is apparent from Table 2, results of only samples No. 9 and 10 show that lithium layer 11 can be transferred to electrode layer 5. In samples No. 9 and 10, substrate 31 made of PP is used and the temperature of substrate 31 at the time of vapor deposition is set to 55° C. In this conditions, even a sample No. 9 in which a film thickness of vapor deposition is made to be as thick as 10.1 μm, transfer can be carried out excellently.

Furthermore, in sample No. 7 in which substrate 31 made of PP which is same as the sample No. 9 is used but vapor deposition is carried out without controlling the temperature, the temperature of substrate 31 rises to 120° C. at the time of vapor deposition. Therefore, the solid state properties of PP are changed and the peel strength rises. As a result, transferring cannot be carried out. Therefore, when lithium layer 11 is formed on substrate 31 by a gas phase method, it is preferable that substrate 31 is cooled. More specifically, it is preferable that the temperature is maintained to be lower than the softening temperature of substrate 31. Table 2 shows that when PP is used as a material of substrate 31, the temperature is kept at 55° C. or less. However, when the range of the molecular weight of PP and forming conditions of lithium layer 11 are taken into consideration, it is preferable that the temperature is maintained to be 100° C. or less.

In Table 2, PP is shown as a preferable material of substrate 31. However, any materials can be used for substrate 31 as long as they can reduce the adhesive strength between lithium layer 11 and substrate 31. That is to say, a material that does not easily form an alloy or does not react with lithium and that has high heat resistance is preferred. Specific examples of polymer material can include polybutylene terephthalate, polyethylene terephthalate, polyphenylene sulfide, polyamide, polyimide, aramid, and the like. Even when such materials are used, it is preferable that substrate 31 is cooled so that the temperature does not reach a temperature causing change in solid state properties (softening or melting due to heat) of materials of substrate 31 when lithium layer 11 is formed by a gas phase method. Meanwhile, when the temperature of substrate 31 is made to be not more than the dew point of the atmosphere inside the chamber in which lithium layer 11 is formed by a gas phase method and the surrounding thereof, dew condensation occurs on substrate 31 after lithium layer 11 is formed and lithium layer 11 may react therewith. Therefore, it is preferable that the temperature of substrate 31 is made to be higher than the dew point of the working atmosphere. For example, it is preferable that the temperature is made to be 0° C. or more. Note here that since lithium reacts with moisture, a material including lithium layer 11 is required to be handled in an atmosphere whose moisture content is managed. That is to say, it is necessary that a dew point of atmosphere of a place in which substrate 31 including lithium layer 11 and electrode layer 5 to which lithium layer 11 is transferred are stored and a place in which transfer is carried out is lower than the peripheral temperature.

Furthermore, when substrate 31 made of metal material is used, from the results shown in Table 2, an excellent transfer state cannot be obtained in any cases. However, when the surface of substrate 31 is roughened or made to have concavity and convexity so as to make the area in which lithium layer 11 is brought into contact with substrate 31 small, adhesion strength therebetween can be reduced and the transfer state can be improved. The processing of substrate 31 in this way can be similarly applied to the case where substrate 31 made of a polymer material is used.

Figure 5:
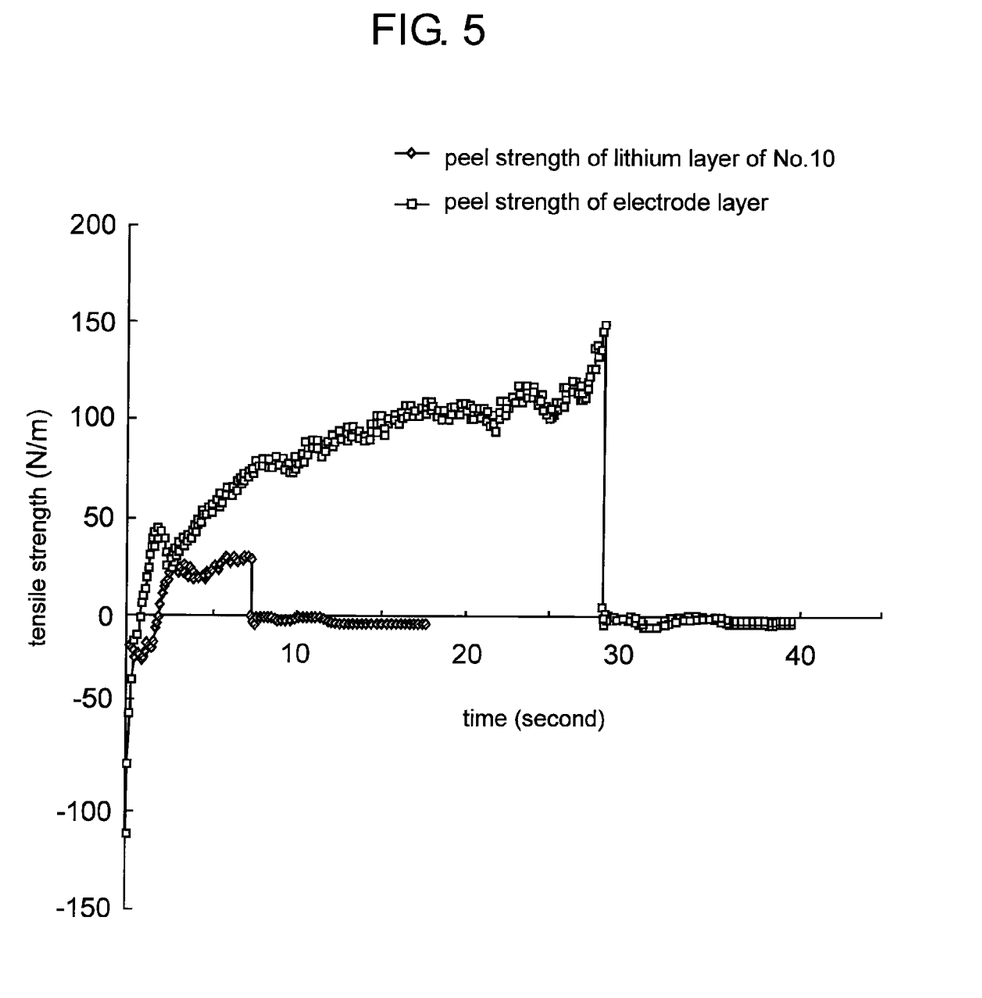
FIG. 5 is a graph showing peel strength of a lithium layer formed on a polypropylene substrate and peel strength of an electrode layer of the negative electrode.

As described, lithium layer 11 can be transferred only when the peel strength of lithium layer 11 with respect to substrate 31 is smaller than the peel strength of electrode layer 5 with respect to current collector 4 (149N/m). As one example, comparison of the measurement results of the peel strength of electrode layer 5 with respect to current collector 4 and the peel strength of lithium layer 11 with respect to substrate 31 in sample 10 is shown in FIG. 5. As mentioned above, in sample 10, lithium layer 11 is formed on substrate 31 while the temperature of substrate 31 made of PP is kept at 55° C. Note here that the grip moving speed when the peel strength is measured is made to be 50 mm/min.

As is apparent from FIG. 5, the peel strength of lithium layer 11 with respect to substrate 31 in sample No. 10 is sufficiently smaller than the peel strength of electrode layer 5 with respect to current collector 4. Furthermore, since lithium layer 11 is peeled off for a short time, lithium layer 11 can be transferred onto electrode layer 5 satisfactorily.

This exemplary embodiment describes an example in which graphite is used in electrode layer 5. However, the present invention is not limited to this. Any materials from graphitizable carbon (soft carbon) made from coke of petroleum or coal as a raw material, low-temperature baked carbon made from graphitizable or non-graphitizable carbon precursor of phenolic resin or petroleum pitch as a raw material, non-graphitizable carbon (hard carbon) made from phenolic resin as a raw material, and the like. The materials corresponding to the respective characteristics may be appropriately selected according to the necessary capacitor properties.

Furthermore, this exemplary embodiment mainly describes a carbon material as a material forming electrode layer 5. However, the present invention is not limited to this. The same effect can be obtained by any materials such as an alloy including lithium in a composition, for example, a lithium alloy, which is a material whose capacity is increased by doping or absorbing lithium.

Furthermore, by coating a mold release agent on substrate 31 on which lithium layer 11 is formed in advance, it is possible to reduce the adhesion strength between lithium layer 11 and substrate 31. That is to say, a mold release agent may be coated on substrate 31 before lithium layer 11 is formed on substrate 31. If the formation speed of lithium layer 11 is increased in order to improve the productivity when lithium layer 11 is formed, the increase in the temperature of substrate 31 cannot be avoided. However, by adjusting the adhesion strength in this way, excellent transfer can be carried out. Therefore, a mold release agent may further be coated on substrate 31 by using substrate 31 and conditions like samples No. 9 and 10. An example of such a mold release agent may include an organic matter having a relatively large molecular weight, for example, a hard wax (candle) or a soft wax, or an organic matter having a relatively small molecular weight, for example, polyvinyl alcohol, ethylene glycol, and the like. Especially, a plant-based or animal-based wax, or a waxy organic matter such as mineral-based, petroleum-based or synthetic wax, a soft-waxy organic matter, and an alcohol organic matter are preferable. Fatty acids, hydrocarbons, and esters are more preferable. Esters of a higher fatty acid and a monohydric or those of higher fatty acids and dihydric higher alcohol are further more preferable.

As the mold release agent, organic matters are mainly described. However, inorganic matter in which particles are controlled to be a polytope shape or concave and convex shape may be used. Particles having such a shape serve as a mold release agent by reducing the area in which substrate 31 is brought into contact with lithium layer 11.

These mold release agents remain on the surface of lithium layer 11 that is transferred to the surface of electrode layer 5 although the amount is small. Therefore, by analyzing a surface of negative electrode 21 inside the electrochemical capacitor or a surface of separator 6 facing negative electrode 21, a material derived from the mold release agent can be detected.

When highly orientational graphite is used as a material constituting electrode layer 5, the total thickness of electrode layer 5 before lithium ion is absorbed and lithium layer 11 is substantially equal to the thickness of electrode layer 5 after lithium ion is absorbed. Therefore, negative electrode 21, positive electrode 22, and separator 6 are fixed easily inside the electrochemical capacitor. Thus, an electrochemical capacitor with high reliability can be produced easily. That is to say, when lithium layer 11 in an amount corresponding to the expansion of electrode layer 5 after lithium ions are absorbed are laminated on electrode layer 5 in advance, the change in the pressure inside the electrodes can be reduced. As a result, an electrochemical capacitor with high reliability can be produced.

Furthermore, this exemplary embodiment describes an example in which winding type element 1 is used. However, the present invention is not particularly limited to this, and a laminated element can be used. In this case, electrode layers 3 and 5 are not necessarily formed on both surfaces of current collectors 2 and 4 and may be formed on one surface. Note here that the above-mentioned effect of fixing electrodes can be obtained when laminated element 1 is produced. However, this effect can be exhibited more remarkably when winding type element 1 is used.

Furthermore, this exemplary embodiment describes an example in which $BF_4^-$ is used as anion 42. However, the present invention is not particularly limited to this, and anions 42 such as $PF_6^-$, $CF_3SO_3^-$, $PF_3(C_2F_5)_3^-$, and $(CF_3SO_2)_2N^-$ may be used. In this case, the same effect can be obtained.

Next, an example in which the peel strength between current collector 4 and electrode layer 5 is improved is described. In Example 2, an electrochemical capacitor is produced by the same way as in Example 1 except that a copper foil having an average thickness of 15 µm whose front and rear surfaces are roughened in advance is used as current collector 4. When capacity and resistance properties of the electrochemical capacitor produced as mentioned above in Example 2 are measured, the capacitance is 136 F and the resistance is 42 mΩ. That is to say, the electrochemical capacitor in accordance with Example 2 shows a performance more excellent than that in Comparative Example and Example 1. Thus, it is thought that by subjecting the surface of current collector 4 to roughening treatment, the adhesion between current collector 4 and electrode layer 5 is improved and the resistance of the electrochemical capacitor is reduced.

In Example 3, a 12 µm-thick anchor layer is formed on current collector 4 used in Example 2. The anchor layer is formed by preparing an anchor layer coating solution and then coating it by using a coater. The anchor layer coating solution is prepared by kneading and dispersing carbon black having an average particle diameter of 0.05 µm in an aqueous solution of carboxymethylcellulose. An electrochemical capacitor is produced by forming electrode layer 5 on the anchor layer by the same way as in Example 1 except for the above-mentioned configuration. When the capacity and resistance properties of the electrochemical capacitor in Example 3 are measured, the capacitance is 139 F and the resistance of 39 mΩ.

That is to say, the electrochemical capacitor of Example 3 shows more excellent performance than Comparative Example and Examples 1 and 2. Thus, it is thought that by subjecting the surface of current collector 4 to roughening treatment and by further providing an anchor layer, the adhesion between current collector 4 and electrode layer 5 is improved and the resistance of the electrochemical capacitor is reduced.

INDUSTRIAL APPLICABILITY

According to a pretreating method and a manufacturing method for a negative electrode of an electrochemical capacitor and a method for manufacturing an electrochemical capacitor using the same, a state in which lithium ions are absorbed in an electrode layer of the negative electrode becomes stable and an electrochemical capacitor having an excellent performance is obtained stably. Furthermore, the productivity can be improved. In particular, it is useful for, for example, a backup power source or regeneration of hybrid cars or fuel cell cars.

The invention claimed is:

1. A method for pretreating a negative electrode of an electrochemical capacitor, the negative electrode including a first electrode layer, the negative electrode being capable of reversibly absorbing and releasing lithium ions, the method comprising:
   (A) forming a lithium layer on a substrate by any of a gas phase method and a liquid phase method; and
   (B) transferring the lithium layer onto a surface of the first electrode layer of the negative electrode,
   wherein the negative electrode includes a first current collector supporting the first electrode layer;
   in the (A), the lithium layer is formed on the substrate so that a peel strength between the lithium layer and the substrate is smaller than a peel strength between the first current collector and the first electrode layer.

2. The method for pretreating an electrochemical capacitor negative electrode according to claim 1,
   wherein in the (A), the lithium layer is formed by the gas phase method while cooling so that a temperature of the substrate becomes higher than a dew point of an atmosphere in which the (A) and (B) are carried out and is less than a temperature for changing solid state properties of a material of the substrate.

3. The method for pretreating an electrochemical capacitor negative electrode according to claim 2, wherein the substrate is made of polypropylene, and in the (A), the temperature of the substrate is kept at 0° C. or more and 100° C. or less.

4. The method for pretreating an electrochemical capacitor negative electrode according to claim 1, wherein in the (A), a mold release agent is coated on the substrate before the lithium layer is formed on the substrate.

5. A method for manufacturing an electrochemical capacitor negative electrode, the method comprising:
   (A) forming a first electrode layer including a material capable of reversibly absorbing and releasing lithium ions on a first current collector;
   (B) forming a lithium layer on a substrate by any of a gas phase method and a liquid phase method; and
   (C) transferring the lithium layer onto a surface of the first electrode layer.

6. The method for manufacturing an electrochemical capacitor negative electrode according to claim 5,
   wherein the negative electrode includes a first current collector supporting the first electrode layer;
   in the (B), the lithium layer is formed on the substrate so that a peel strength between the lithium layer and the substrate is smaller than a peel strength between the first current collector and the first electrode layer.

7. The method for manufacturing an electrochemical capacitor negative electrode according to claim 6,
   wherein in the (B), the lithium layer is formed by the gas phase method while cooling so that a temperature of the substrate becomes higher than a dew point of an atmosphere in which the (B) and (C) are carried out and is less than a temperature for changing solid state properties of a material of the substrate.

8. The method for manufacturing an electrochemical capacitor negative electrode according to claim 7, wherein the substrate is made of polypropylene, and in the (A), the temperature of the substrate is kept at 0° C. or more and 100° C. or less.

9. The method for manufacturing an electrochemical capacitor negative electrode according to claim 5, wherein in the (B), a mold release agent is coated on the substrate before the lithium layer is formed on the substrate.

10. A method for manufacturing an electrochemical capacitor, the method comprising:
    (A) forming a first electrode layer including a material capable of reversibly absorbing and releasing lithium ions on a first current collector;
    (B) forming a lithium layer on a substrate by any of a gas phase method and a liquid phase method;
    (C) transferring the lithium layer onto a surface of the first electrode layer so as to produce a negative electrode;
    (D) forming a polarizable second electrode layer mainly including activated carbon on a second current collector so as to produce a positive electrode;
    (E) producing an element by allowing the first electrode layer and the second electrode layer to face each other with a separator interposed between the positive electrode and the negative electrode;
    (F) accommodating the element and an organic electrolyte solution including lithium ions in a case having an opening; and
    (G) sealing the opening of the case.

11. The method for manufacturing an electrochemical capacitor according to claim 10,
    wherein the negative electrode includes a first current collector supporting the first electrode layer;
    in the (B), the lithium layer is formed on the substrate so that a peel strength between the lithium layer and the substrate is smaller than a peel strength between the first current collector and the first electrode layer.

12. The method for manufacturing an electrochemical capacitor according to claim 11,
    wherein in the (B), the lithium layer is formed by the gas phase method while cooling so that a temperature of the substrate becomes higher than a dew point of an atmosphere in which the (B) and (C) are carried out and is less than a temperature for changing solid state properties of a material of the substrate.

13. The method for manufacturing an electrochemical capacitor according to claim 12, wherein the substrate is made of polypropylene, and in the (A), the temperature of the substrate is kept at 0° C. or more and 100° C. or less.

14. The method for manufacturing an electrochemical capacitor according to claim 10, wherein in the (B), a mold release agent is coated on the substrate before the lithium layer is formed on the substrate.

* * * * *